United States Patent
Bahl et al.

(10) Patent No.: US 7,248,570 B2
(45) Date of Patent: Jul. 24, 2007

(54) SYSTEM AND METHOD FOR COORDINATING BANDWIDTH USAGE OF A COMMUNICATION CHANNEL BY WIRELESS NETWORK NODES

(75) Inventors: Pradeep Bahl, Redmond, WA (US); Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 09/953,980

(22) Filed: Sep. 17, 2001

(65) Prior Publication Data

US 2003/0053437 A1    Mar. 20, 2003

(51) Int. Cl.
*H04Q 7/00* (2006.01)
(52) U.S. Cl. .................. 370/329; 370/345; 370/349; 370/254
(58) Field of Classification Search ............... 370/329, 370/349, 338, 332, 312, 254
See application file for complete search history.

(56) References Cited

U.S. PATENT DOCUMENTS 5,566,331 A    10/1996  Irwin, Jr. et al.
5,590,133 A *  12/1996  Billstrom et al. ........... 370/349
5,727,212 A     3/1998  Dinallo (Continued)

FOREIGN PATENT DOCUMENTS

EP    0 597 640 A1    5/1994

(Continued)

OTHER PUBLICATIONS

Anonymous, "ETSI Digital Cellular Telecommunications System (Phase 2+): Terminal Equipment to Mobile Station (TE-MS) Multiplexer Protocol", *Global System for Mobile Communications*, vol. 101, No. 369, pp. 2-54 (1998).

(Continued)

*Primary Examiner*—Wing Chan
*Assistant Examiner*—Andrew C. Lee (57) ABSTRACT

A system and method is provided for coordinating wireless bandwidth usage of a common frequency band by wireless nodes in two disjoint networks, such as an infrastructure ("IS") network and an ad hoc ("AH") network. When AH nodes move into the transmission range of an access point of the IS network, they register with the access point and listen to the access point to tell them when they are allowed to transmit data over a given transmission channel. The access point coordinates the bandwidth usage by broadcasting ad hoc mode poll signals to indicate that the ad hoc nodes may transmit over the channel, and sending infrastructure mode poll signals to indicate that a wireless node in the IS network can transmit over the given channel. The access point makes a fraction of the bandwidth available for communications by the wireless AH nodes in its transmission range, while guaranteeing the rest of the bandwidth for wireless nodes in the IS network.

9 Claims, 6 Drawing Sheets

U.S. PATENT DOCUMENTS

| | | | | |
|---|---|---|---|---|
| 5,796,727 | A | * | 8/1998 | Harrison et al. ............ 370/338 |
| 5,815,682 | A | | 9/1998 | Williams et al. |
| 5,881,372 | A | | 3/1999 | Kruys |
| 5,918,158 | A | | 6/1999 | LaPorta et al. |
| 5,949,776 | A | * | 9/1999 | Mahany et al. ............. 370/338 |
| 5,987,062 | A | * | 11/1999 | Engwer et al. ............. 375/225 |
| 6,041,075 | A | | 3/2000 | Caushik |
| 6,101,176 | A | * | 8/2000 | Honkasalo et al. ......... 370/335 |
| 6,134,587 | A | * | 10/2000 | Okanoue .................... 709/222 |
| 6,202,147 | B1 | | 3/2001 | Slaughter et al. |
| 6,219,707 | B1 | | 4/2001 | Gooderum et al. |
| 6,226,719 | B1 | | 5/2001 | Minow |
| 6,282,577 | B1 | * | 8/2001 | Okanoue et al. ............ 709/250 |
| 6,307,843 | B1 | * | 10/2001 | Okanoue .................... 370/312 |
| 6,377,608 | B1 | * | 4/2002 | Zyren ......................... 375/132 |
| 6,393,261 | B1 | * | 5/2002 | Lewis ........................ 455/103 |
| 6,470,397 | B1 | | 10/2002 | Shah et al. |
| 6,480,711 | B1 | | 11/2002 | Guedalia |
| 6,577,609 | B2 | * | 6/2003 | Sharony ..................... 370/312 |
| 6,584,080 | B1 | * | 6/2003 | Ganz et al. ................. 370/315 |
| 6,600,726 | B1 | | 7/2003 | Nevo et al. |
| 6,603,744 | B2 | | 8/2003 | Mizutani et al. |
| 6,614,350 | B1 | * | 9/2003 | Lunsford et al. ........ 340/572.1 |
| 6,614,768 | B1 | | 9/2003 | Mahany et al. |
| 6,633,929 | B1 | | 10/2003 | Hyder et al. |
| 6,732,176 | B1 | * | 5/2004 | Stewart et al. ............. 709/227 |
| 6,754,250 | B2 | * | 6/2004 | Haartsen ..................... 375/132 |
| 6,771,609 | B1 | * | 8/2004 | Gudat et al. ................ 370/254 |
| 6,782,264 | B2 | * | 8/2004 | Anderson ................ 455/456.1 |
| 6,791,959 | B1 | * | 9/2004 | Palmer et al. .............. 370/332 |
| 6,807,165 | B2 | * | 10/2004 | Belcea ....................... 370/347 |
| 6,842,460 | B1 | * | 1/2005 | Olkkonen et al. .......... 370/465 |
| 6,850,503 | B2 | * | 2/2005 | Dorenbosch et al. ....... 370/331 |
| 6,870,822 | B2 | * | 3/2005 | Balogh ....................... 370/332 |
| 6,877,104 | B1 | * | 4/2005 | Shimono ....................... 714/4 |
| 6,928,061 | B1 | * | 8/2005 | Garcia-Luna-Aceves et al. .......................... 370/329 |
| 6,954,790 | B2 | * | 10/2005 | Forslow ..................... 709/227 |
| 6,961,329 | B1 | * | 11/2005 | Bender et al. .............. 370/342 |
| 6,965,942 | B1 | * | 11/2005 | Young et al. ............... 709/232 |
| 6,967,944 | B2 | * | 11/2005 | Choi .......................... 370/348 |
| 7,072,323 | B2 | * | 7/2006 | Roberts et al. ............. 370/338 |
| 2002/0012329 | A1 | | 1/2002 | Atkinson et al. |

FOREIGN PATENT DOCUMENTS

| | | |
|---|---|---|
| EP | 0 848 560 A2 | 6/1998 |
| WO | WO 99/21313 A2 | 4/1999 |
| WO | WO 99/33301 A1 | 7/1999 |
| WO | WO 99/39480 A2 | 8/1999 |
| WO | WO 99/50999 A1 | 10/1999 |
| WO | WO 00/10357 A1 | 2/2000 |

OTHER PUBLICATIONS

Anonymous, "IEEE 802-11 Security White Paper," *Windows NT Networking*, Sep. 26, 2000, printed at:<\\networking\pm\WhistlerSpecs\Core> Networking\IEEE 802.11 Security White Paper.

Anonymous, "Interoperability Requirements for Bluetooth as a WAP Bearer", *Bluetooth Specification Version 1.0B*, Part F:4, pp. 496-515 (Nov. 1999).

Anonymous, "Core", *Specification of the Bluetooth System Version 1.0B*, vol. 1, pp. 1-1082 (Dec. 1999).

Anonymous, "Profiles", *Specification of the Bluetooth System Version 1.0B*, vol. 2, pp. 1-440 (Dec. 1999).

Ayyagari, et al., "IEEE 802.11 Quality of Service," *White Paper*, printed at http://grouper.ieee.org/groups/802/11Documents/DT1-50.html pp. 2-9 (Feb. 15, 2000).

Bahl, Victor and Holland, Gavin, "Enhancing the Windows Network Device Interface Specification for Wireless Networking," *Microsoft Research Technical Report*, MSR-TR-2000-84, (Aug. 2000).

Bahl, et al., "The Choice Network—Broadband Wireless Internet Access In Public Places," *Microsoft Research Technical Report*, MSR-TR-2000-21, (Feb. 2000).

Bahl, Victor and Miu, Allen, "The Choice Network—Dynamic Host Configuration for Managing Mobility Between Public and Private Networks," *Microsoft Research Technical Report*, MSR-TR-2000-85, pp. 1-14 (Aug. 2000).

Bhagwat, Pravin, "Networking Over Bluetooth: Overview and Issues", IAB Wireless Workshop, pp. 1-48 (Mar. 2000).

Broch, et al., "Supporting Hierarchy and Heterogeneous Interfaces in Multi-Hop Wireless Ad Hoc Networks," *Proceedings of the Workshop on Mobile Computing, I-SPAN*, pp. 1-6 (Jun. 1999).

Cant, Chris, "Windows Driver Model (WDM) Device Drivers," PHD Computer Consultants Ltd., pp. 1-13 printed at http://www.phdcc.com/WDMarticle.html on Mar. 20, 2003 (1999).

Fleming et al., "Architectural Overview of Intel's Bluetooth Software Stack," *Intel Technology Journal*, Q2, pp. 1-10 (2000).

Foley, Dr. Michael W., "Bluetooth User Experience in Windows," Microsoft Corporation.

Gholmieh, Ralph A., "IEEE 802.11," printed at http://cwc.ucsd.edu/~rgholmie/WirelessPaper/node4.html#SECTION00031000000000000000 (Oct. 5, 1998).

Gholmieh, Ralph A., "Overview of Current Research Issues and Developments in Wireless LANS and Wireless ATM", University of San Diego, pp. 1-25 printed at http://cwc.ucsd.edu/~rgholmie/WirelessPaper/WirelessPaper.html on May 11, 2004 (Oct. 1998).

Haartsen, J.C and S. Mattisson, "Bluetooth—A New Low-Power Radio Interface Providing Short-Range Connectivity," *Proceedings of the IEEE*, vol. 88, No. 10, pp. 1651-1661 (Oct. 2000).

Haartsen, J.C. and S. Mattisson, "Bluetooth-A New Radio Interface providing Ubiquitous Connectivity," *Proceedings of the IEEE*, pp. 107-111 (Oct. 2000).

Hall et al., "Programming with Sockets," *Windows Sockets: An Open Interface for Network Programming under Microsoft Windows Version 1.1*, pp. 4-11 printed at http://burks.brighton.ac.uk/burks/pcinfo/progdocs/winsock/winsock.htm on Jun. 15, 2004 (Jan. 1993).

IEEE Standard 802-11.1997, *IEEE Standard for Wireless LAN Medium Access Control (MAC) and Physical Layer (PHY) Specification*, IEEE (Jun. 1997).

IEEE Standard 802.11.1999, , *IEEE Standard for Wireless LAN Medium Access Control (MAC) and Physical Layer (PHY) Specification*, IEEE (1999).

Kardach, James, "Bluetooth Architecture Overview," Intel Corporation.

Megowan et al., "IrDA Object Exchange Protocol," *Counterpoint Systems Foundry*, pp. 2-85 (Mar. 18, 1999).

Mettala, Riku, "Bluetooth Protocol Architecture," Bluetooth Special Interest Group, Nokia Mobile Phones, pp. 1-20 (Sep. 1999).

Microsoft Corporation, "Plug and Play for Windows NT 5.0," *Windows NT Server*, pp. 1-23 (1997).

Microsoft Corporation, "Remote NDIS Specification", Rev. 0.80, pp. 1-50 (Oct. 1999).

Microsoft Corporation, "Windows Whistler IRPs for Bluetooth," *Bluetooth Design Review*, Draft Version 0.7, pp. 1-23 (Jun. 2000).

Miller, Brent, "Mapping Salutation Architecture APIs to Bluetooth Service Discovery Layer," Version 1.0, Bluetooth Special Interest Group, IBM Corp., pp. 1-26 (Jul. 1999).

Moore, Tim, "Windows Wireless Architecture," Microsoft Corporation.

O'Hara, Bob and Petrick, Al, *The IEEE 802.11 Handbook A Designer's Companion*, Standards Information Network IEEE Press, pp. 2-174 (1999).

Rajagopal, Sridhar, "RFCOMM Protocol Basics," Intel Corporation, pp. 1-42 (Dec. 1999).

Ray, Ken and Stan Adermann, "Bluetooth Stack in Windows," Microsoft Corporation.

Richard III, Golden G., "Service Advertisement and Discovery: Enabling Universal Device Cooperation," *IEEE Internet Computing*, pp. 18-26 (Sep. 2000).

Sobrinho, Joäo L. and A.S. Krishnakumar, "Quality-of-Service in Ad Hoc Carrier Sense Multiple Access Wireless Networks," *IEEE Journal on Selected Areas in Communications*, vol. 17, No. 8, pp. 1353-1368 (Aug. 1999).

Sörensen, Johan, "RFCOMM in depth," pp. 1-42 (Dec. 1999).

Tomlinson, Paula, "Plug and Play," *Windows Developer's Journal*, pp. 1-6 (Dec. 1995).

Udell, Jon, "Windows NT Up Close" An In-depth Look at Microsoft's Next-Generation Operating System, *Byte*, vol. 17, No. 10, pp. 167-182 (Oct. 1992).

UPnP Forum, "UPnP Device Architecture," pp. 1-52 printed at http://www.upnp.org/download/UPnPDA10_20000613.htm on Jun. 15, 2004 (Jun. 2000).

Weinmiller et al., "Analyzing and Improving the IEEE 802.11-MAC Protocol for Wireless LANs," *Proceedings of MASCOTS '96*, pp. 200-206 (1996).

\* cited by examiner

SYSTEM AND METHOD FOR COORDINATING BANDWIDTH USAGE OF A COMMUNICATION CHANNEL BY WIRELESS NETWORK NODES

TECHNICAL FIELD

This invention relates generally to communications over wireless computer networks. In particular, the invention relates to bandwidth usage of a communication channel by wireless nodes in different types of networks that have overlapping transmission ranges.

BACKGROUND OF THE INVENTION

Devices using network communications over wireless links are becoming increasing popular. Wireless links typically transmit data over radio frequency channels but may operate over other carrier frequency ranges, such as infrared. Most radio frequency based wireless networks are designed to operate in two basic modes: the infrastructure mode and the peer-to-peer or ad hoc mode. In the infrastructure ("IS") mode, which is also sometimes referred to as the managed network mode, each wireless network node communicates with the other nodes through an access point ("AP") node of the IS network. The access point functions as a bridge, repeater, gateway, and firewall between wireless nodes and wired nodes of the network. The access point may also apportion bandwidth to the wireless IS nodes to ensure the quality of the communications.

In the ad hoc ("AH") mode, a wireless node communicates directly, i.e., in a peer-to-peer fashion, with other nodes within its RF range without going through an intermediate node such as the access point of the IS network. Ad hoc wireless network connections are useful when close-by users want to communicate with each other in places where no IS network exists, or when they fail to be authorized by the access point of an existing IS network.

At a given location, there may be an IS network coexisting with an AH network whose range overlaps with that of the IS network. Moreover, the IS wireless devices and AH wireless devices may try to communicate over the same frequency channel. The two networks, however, are disjoint in that the nodes in one network generally are not able to directly communicate with the nodes in the other network. When wireless devices of different networks try to transmit over the same channel, conflicts in bandwidth usage may arise. For example, in one scenario, a sales representative is waiting at an airport lounge to catch a flight. The airport has a public local area network (LAN) that supports an IS wireless network and has an access point in the lounge. To use the few remaining minutes before his flight takes off, he decides to download his email and some power point files from his corporate network over a wireless link through the airport's IS network so that he can work on his upcoming customer presentation during his long flight. Being short on time he negotiates with the airport's IS network some additional bandwidth for his session to allow him to complete his downloads quickly. In the meantime, a group of students who are located close to him and equipped with computers and wireless LAN cards start to communicate with each other wirelessly over an AH network that uses the same frequency channel as the airport's IS network. A computer of one of the students may attempt to transmit at the same time the sales representative's computer attempts to transmit, resulting in a conflict. When the two computers detect this conflict, both of them enter into a back-off state and try later to retransmit when the frequency channel is clear. As a result, the AH network formed by the students adversely affect the bandwidth guarantees promised to the sales representative by the IS network.

SUMMARY OF THE INVENTION

In view of the foregoing, the invention provides a system and method for coordinating wireless bandwidth usage by wireless nodes in first and second networks, such as an infrastructure ("IS") network and an ad hoc ("AH") network, respectively, that are disjoint but are in the vicinity of each other and use the same communication frequency channel. When a node in the second network moves into the transmission range of a control node (e.g., an access point of the IS network), it registers with the control node and listens to the control node to tell it when it is allowed to transmit data over the frequency channel. The control node coordinates the bandwidth usage by broadcasting poll signals of a first type to indicate that at least one node in the first network may transmit over the channel, and sending poll signals of a second type to indicate that at least one wireless node in the second network can start to transmit over the frequency channel. In this way, the control node makes a fraction of the bandwidth available for communications by the wireless nodes in the second network in its transmission range, while guaranteeing the rest of the available bandwidth for wireless nodes in the first network, and coordinates the transmissions by the nodes to avoid collisions, thereby optimizing bandwidth usage of the frequency channel.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment.

Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
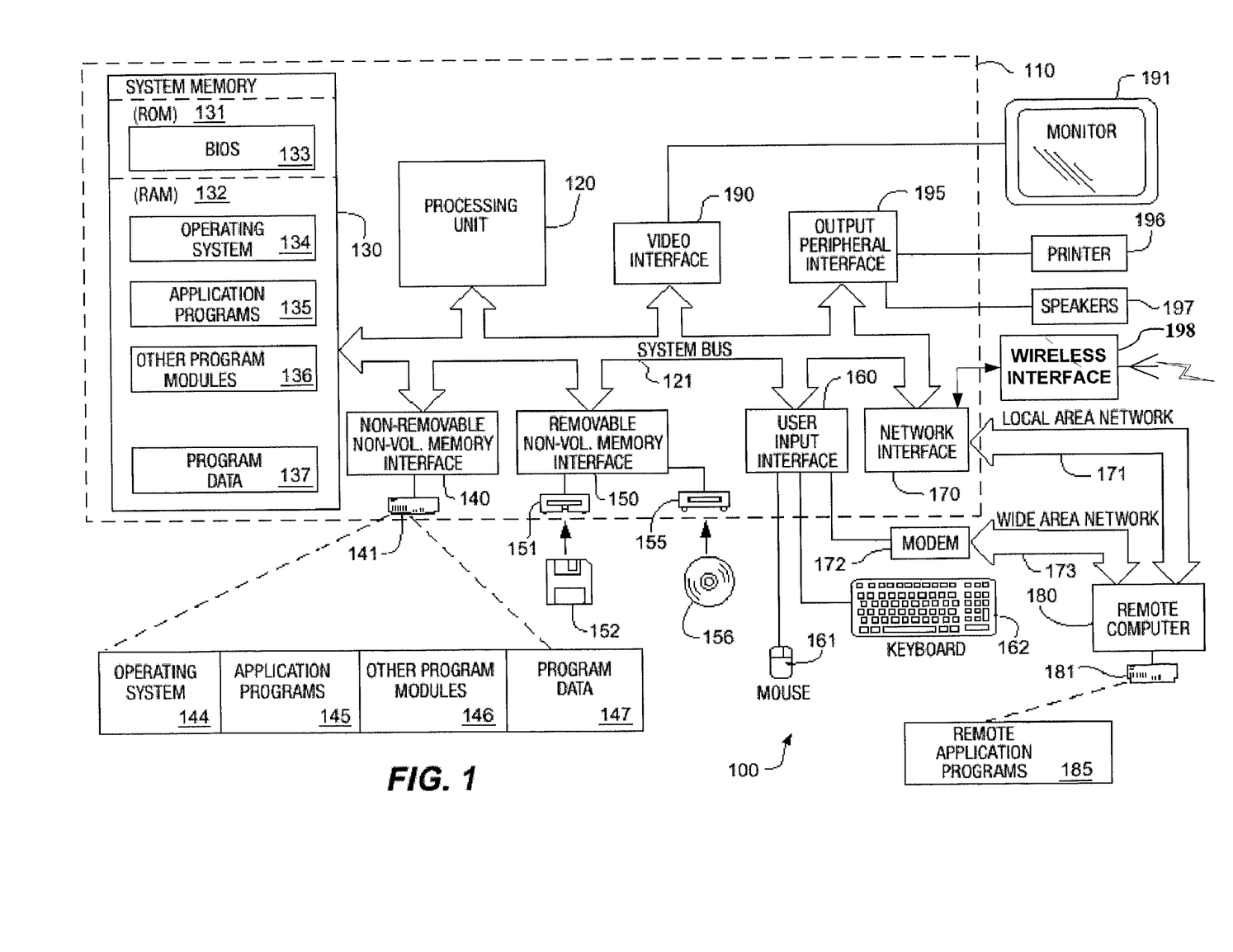
FIG. 1 is a block diagram generally illustrating an exemplary computer system on which the present invention may reside.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system ("OS") 134, application programs 135, other program modules 136, and program data 137. Often, the OS 134 offers services to applications programs 135 by way of one or more application programming interfaces (APIs) (not shown). Because the OS 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. For instance, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an OS 144, application programs 145, other program modules 146, and program data 147. Note that these components can either be the same as or different from the OS 134, application programs 135, other program modules 136, and program data 137. The OS 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171, personal area network (PAN) and a wide area network (WAN) 173. Of particular interest to the present invention is the computer's capability to form at least one wireless link, for instance via wireless interface 198 with an radio frequency antenna, but may also include modules and components for transmitting and receiving over other carrier frequency ranges, such as infrared. Such networking environments are commonplace in offices, enterprise-wide computer networks, intranets, and the Internet or are expected to be introduced in the near future.

When used in a LAN networking environment, the computer 110 is connected to the LAN 171 through a network interface or adapter 170 or a wireless transmitter. When used in a WAN networking environment, the computer 110 typically includes a modem 172, wireless antenna or other means for establishing communications over the WAN 173, such as the Internet. The familiar modem 172, which may be internal or external, may be connected to the system bus 121 via the user-input interface 160, or via another appropriate mechanism. With the advent of 2.5G and 3G wireless wide area network ("WWAN") systems, the interface could also be a WWAN packet based network interface card ("NIC"). In a networked environment, program modules depicted relative to the computer 110, or portions thereof, may be stored in a remote memory storage device. By way of example, FIG. 1 illustrates remote application programs 185 as residing on memory device 181, which may be internal or external to the remote computer 180.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

The present invention is directed to a system and method that enables the coordination of the transmissions by wireless nodes in two disjoint wireless networks over a common frequency channel, thereby minimizing the chances of collision and optimizing the usage of the frequency channel. In a preferred embodiment, the two disjoint wireless networks include an infrastructure ("IS") network and an ad hoc ("AH") network.

Figure 2:
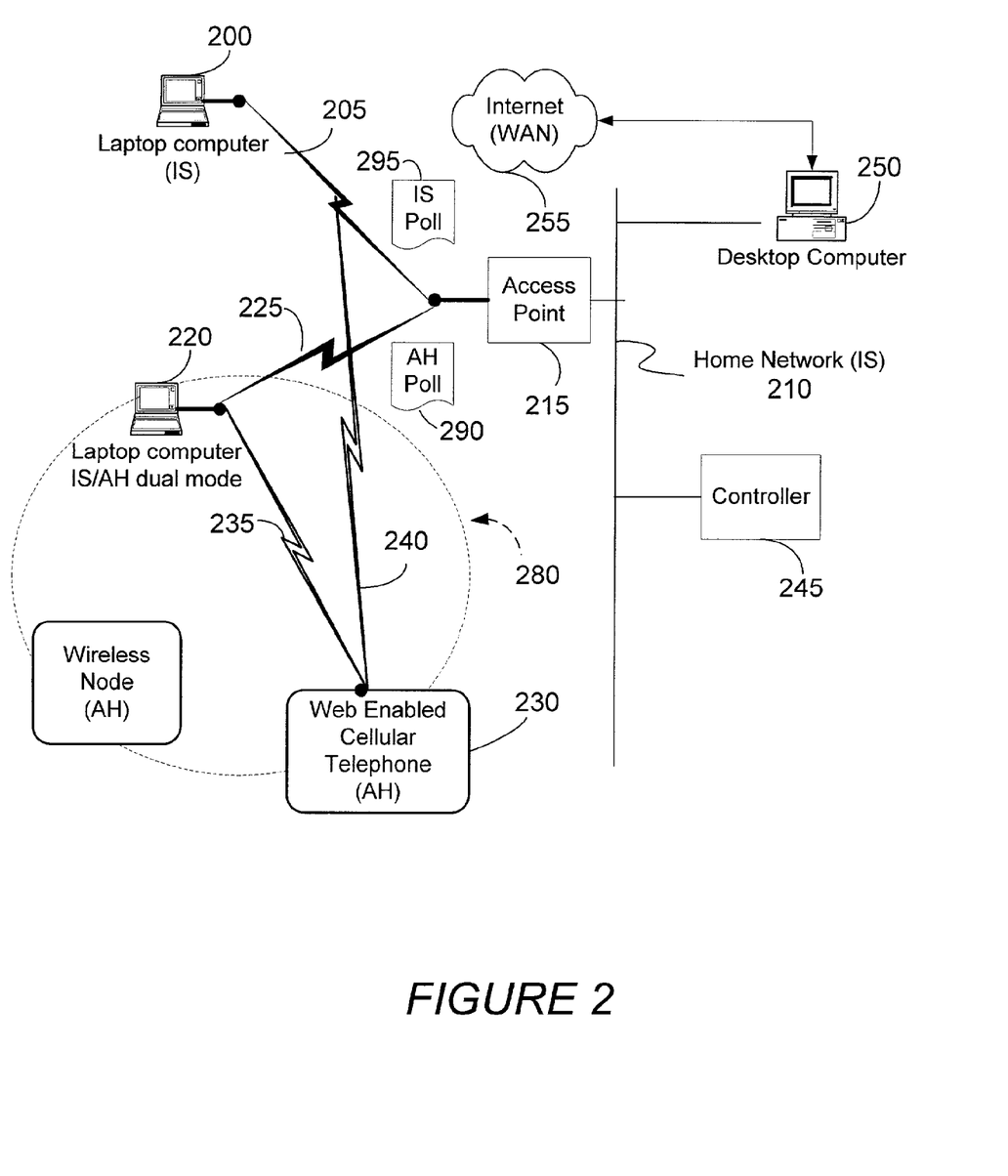
FIG. 2 is a schematic diagram illustrating an exemplary computing environment in which an embodiment of the invention is implemented.

FIG. 2 illustrates an exemplary computing environment that includes multiple devices that use wireless transmissions to communicate with one another. In this environment, an IS network co-exists with an AH network such that their transmission ranges overlap. In the particular example illustrated in FIG. 2, the IS network is a home network 210, which has an access point node 215 for communicating with wireless devices in the IS network. A laptop computer 200 in the IS network forms a radio frequency wireless link 205 with the access point 215. As part of the IS communication scheme, the home network 210 assigns the laptop computer 200 with a routable network IP address, the prefix of which is the same as that for other nodes within the home network 210. The computing environment depicted in FIG. 2 includes another laptop computer 200 communicating with the access point 210 via a radio frequency link 225. The laptop computer 220 also has a distinct IP address for communicating as a node in the IS network 210. The access point 215 controls traffic to and from the laptop computers 200 and 220. This control is exerted for providing quality of service assurances to tasks or applications executing on the aforesaid laptop computers.

The access point 215 manages the communications of the IS wireless nodes by transmitting poll signals (termed "infrastructure poll signals") to direct an IS wireless node, such as the laptop computer 200, to transmit its packets in a specified time period. In the embodiment of the invention illustrated in FIG. 2, a controller 245 provides control information to the access point 215 to initiate transmission of poll messages for the traffic control. Alternatively, the functionality of the controller 245 is integrated with the access point itself. Through the access point, the wireless nodes 200 and 220 can access other nodes in the home network 210 and beyond to other networks, such as the Internet 255.

In accordance with a feature of a preferred embodiment that is described in greater detail below, a wireless device may operate not only as a node in an IS network but also as a node in an AH network. In other words, a wireless device may be a "dual-mode" device. For instance, in the example illustrated in FIG. 2, the laptop computer 220 is such a dual-mode device. It is part of the IS network 210 when it operates in the IS mode and part of an AH network 280 when it operates in the AH mode. The AH network 280 illustrated in FIG. 2 includes a cellular phone 230 that communicates with the laptop computer 220 over a wireless link 235. While communicating with the cellular phone 230, the laptop computer 520 is in the AH mode and is responsive to an IP address in the autonet or ad-hoc address range. In other words, laptop computer 520 responds to two different IP addresses—the infrastructure address and the ad-hoc address. Autonet IP addresses are non-routable and are in a specified range of possible addresses reserved for AH communications. In version 4 of the IP specification, this range may cover addresses from 169.254.254.0 to 169.254.254.255.

Conventionally, peer-to-peer communications do not use a central control node like the access point 215 of the IS network for directing AH nodes to transmit in specified time slots. Instead, the AH nodes communicate whenever they detect the medium is unoccupied. Without the coordination scheme in accordance with the invention, wireless transmissions 240 from the ad-hoc devices may collide with the transmission by an IS device during the time it is granted access to the medium by the access point if the wireless AH network node uses the same frequency channel used by the wireless IS network. For instance, as depicted in FIG. 2, transmissions by the laptop computer 200 to communicate with the access point 215 over wireless link 205 may collide with the transmissions by the AH nodes. A consequence of such a collision is that both of the transmitting wireless devices enter a back-off period before trying again to transmit their packets. As a result, the presence of an AH network nodes within the range of the IS network can interfere with the wireless communications in the IS network, thereby disrupting the quality of service assurances offered by the IS network to the wireless IS nodes.

The present invention provides a coordination scheme that effectively avoids the conflicting bandwidth usage by two co-existing disjoint wireless networks as described above. In accordance with the invention, when wireless nodes in an AH network are within the wireless transmission range of an IS network, they are required to listen to an access point of the IS network, which tells the AH nodes when it is their turn to transmit over a given frequency channel. When not in the vicinity of an access point, the AH nodes will communicate the way they do conventionally. For instance, they may try to sense the channel for idle period before transmitting based on the distributed coordination function ("DCF") of the MAC protocol of the IEEE 802.11 standard, which is similar to the CSMA/CA (Carrier Sense Multiple Access/Collision Avoidance).

For this coordination scheme to work, the access point of the IS network needs to know the existence of the AH nodes within its range. In a preferred embodiment, this is accomplished by requiring the AH nodes to register themselves with the access point. The AH nodes, like the IS nodes, go into a periodic scanning mode to see which wireless nodes are in their vicinity. When in the scanning mode, they discover the other AH nodes as well as all access points of the IS network and the frequencies at which they are transmitting by receiving beacon or poll signals being sent by the access points and the other AH nodes.

When an AH node detects the existence of an access point of the IS network in its vicinity, it registers, or "associates," itself with that access point. Conventionally, only IS nodes associate with the AP. The association involves exchange of packets according to the protocol between the AP and the IS nodes. In contrast with conventional AH nodes, the AH nodes implementing the coordination scheme of the invention are modified to scan for access points, such as the access point 515, of IS networks and then associate (register) with them. An AH node engages in the same protocol used by the IS nodes to associate itself with an AP. In the association process, it will identify itself as an AH node. The IS nodes, in contrast, will identify themselves to the access point as IS nodes. A dual mode node existing in a preferred embodiment will identify itself as both an AH node and an IS node.

The access point keeps an active count of all wireless devices registered with it as AH nodes. This would include all the AH-only and dual-mode devices that have registered with it. The access point uses this count and the count of the IS wireless nodes (including IS-only and dual-mode nodes) to determine the bandwidth to be given for AH mode transmission. Preferably, the access point reserves a given percentage of the bandwidth for AH network operations while the remaining bandwidth is reserved for IS network operation. The percentage for the AH operation may be either configurable but fixed during operation or dynamically adjusted with pre-selected limits based on parameters such as the counts of the IS and AH nodes. The particular scheme to use is policy driven.

In the illustrated embodiment where the two disjoint networks are an IS network and an AH network, the access point coordinates the bandwidth usage of the IS and AH networks by sending poll signals to the wireless nodes in the two networks. Each poll signal corresponds generally to a time slot or interval, the length of which may be pre-selected or dynamically varied.

Still referring to FIG. 2, there are two types of poll signals, corresponding to the two types of wireless networks. The first type is called the "AH poll signal," which is broadcast to all the AH nodes, including AH-only and dual-mode nodes, that registered with the access point. An AH poll signal 290 indicates to the AH nodes that they may transmit over the given channel for the time slot associated with the poll signal. Once permitted to speak, the AH nodes would coordinate among themselves for utilizing the bandwidth for peer-to-peer communications.

The second type of poll signal is called the "IS poll signal." Each IS poll signal 295 is used to indicate to an IS node that it may transmit over the wireless channel. In contrast to the AH poll signal 290 which is broadcast to all AH nodes, the IS poll signal 295 is "unicast" (in the network addressing sense) to the particular IS node, such as the laptop computer 200. In other words, the nodes operating in the IS mode are individually told when to speak and for how long, while the AH nodes are told as a group when to speak and for how long. Thus, unlike the IS case, there is no individual control of the AH nodes by the access point 210. This keeps the access point's processing with respect to the AH nodes to a minimum and also minimizes bandwidth consumption by polling. It should be noted that the access point is not necessarily aware of all ad-hoc nodes in its vicinity. Instead, it can determine whether transmitting the ad-hoc poll signal is desirable from detecting as few as one ad-hoc wireless node. In alternative embodiments, the access point may provide the ad-hoc poll signals regardless of whether it has detected adhoc wireless nodes in its vicinity.

The frequency and timing of the two types of poll signals depend on the percentage of bandwidth reserved for the AH nodes. For instance, referring to FIG. 2, if the access point 215 has been configured to keep no more than 20% of the bandwidth on the wireless channel for AH networking, it would send AH poll signals such that AH communications can take place 20% of the time. It would use the IS poll signals to give the remaining 80% of the time, for initiating IS mode transmission.

Figure 3:
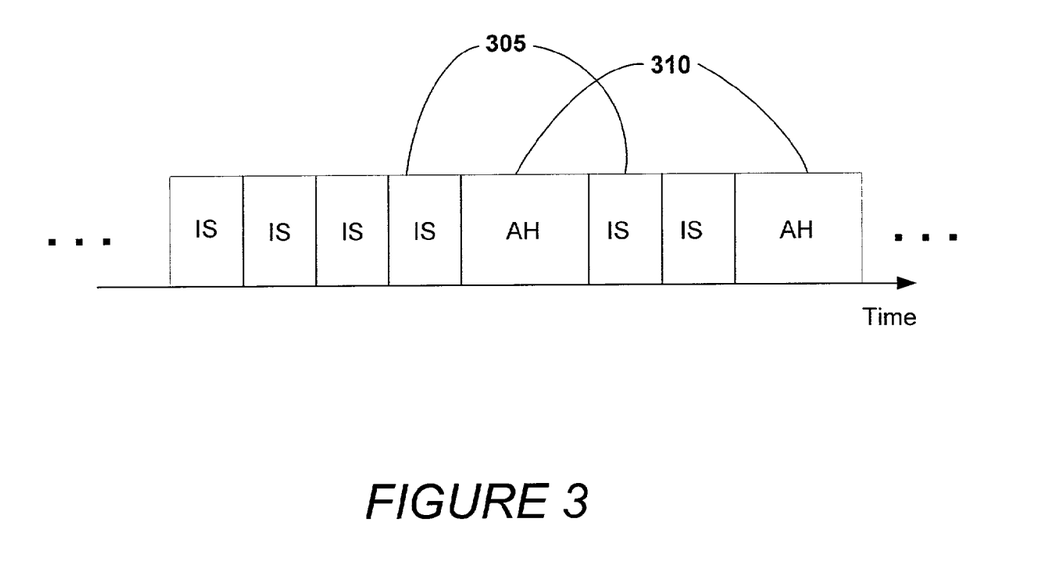
FIG. 3 is a schematic diagram illustrating an exemplary arrangement of time slots for infrastructure and ad hoc wireless transmissions.

By way of example, FIG. 3 shows an exemplary time plot of the time slots corresponding to the poll signals sent by the access point. As shown in FIG. 3, there are multiple interleaving IS time slots 305 and AH time slots 310. Each IS time slot is for a particular IS node to transmit over the wireless channel, while each AH time slot is for the AH nodes as a group. The IS and AH time slots are arranged such that the AH time slots constitute a percentage of the overall time reserved by the access point for the AH network to communicate over the wireless channel. It will be appreciated that FIG. 3 is provided only for illustrating the generally concept of sharing the time for transmitting over the frequency band among the nodes of the two different wireless networks. The time distribution scheme in actual applications may be more complicated. For instance, The IEEE 802.11 standard defines a MAC protocol formed of two separate coexisting coordination functions: the distributed coordination function ("DCF") and the point coordinate function ("PCF"). Accordingly, the time for wireless transmission may be divided into PCF periods (which are contention-free) and DCF periods (which are not contention-free). In an embodiment implementing the MAC protocol, the above discussion of controlling the transmissions of IS and AH nodes refers to the PCF periods and not to the DCF periods.

As mentioned above, in accordance with a feature of a preferred embodiment, a wireless node may be a dual-mode node, meaning that it may operate at the same time as both an IS network node and an AH network node. The dual-mode wireless device can be switched easily between the two wireless communication modes corresponding to the two disjoint wireless networks. By switching back and forth between the two modes, the dual-mode device can participate in both wireless networks without having to be disconnected from one network in order to communicate over the other network.

In one implementation, to enable the mode switching, a wireless controller driver is provided as an inserted module (typically called a "shim") in the networking stack (e.g., the IP stack) above the actual wireless drivers. The wireless controller driver exposes two "virtual network adapters" to the higher layer in the network protocol stack. The term "adapter" is typically used in the context of operating system architecture to represent a network interface card. It is a handle that, when passed in a function, relates the request made to a particular physical network interface card ("NIC," also called a network adaptor). In this case, the wireless controller driver will associate the request, i.e. the packet sent with the request, with a particular mode of operation of a "single" wireless network card. Since each of the two adapters exposed are for the same physical wireless network adapter but imply different modes of operation, they are referred to herein as "virtual adapters."

Figure 4:
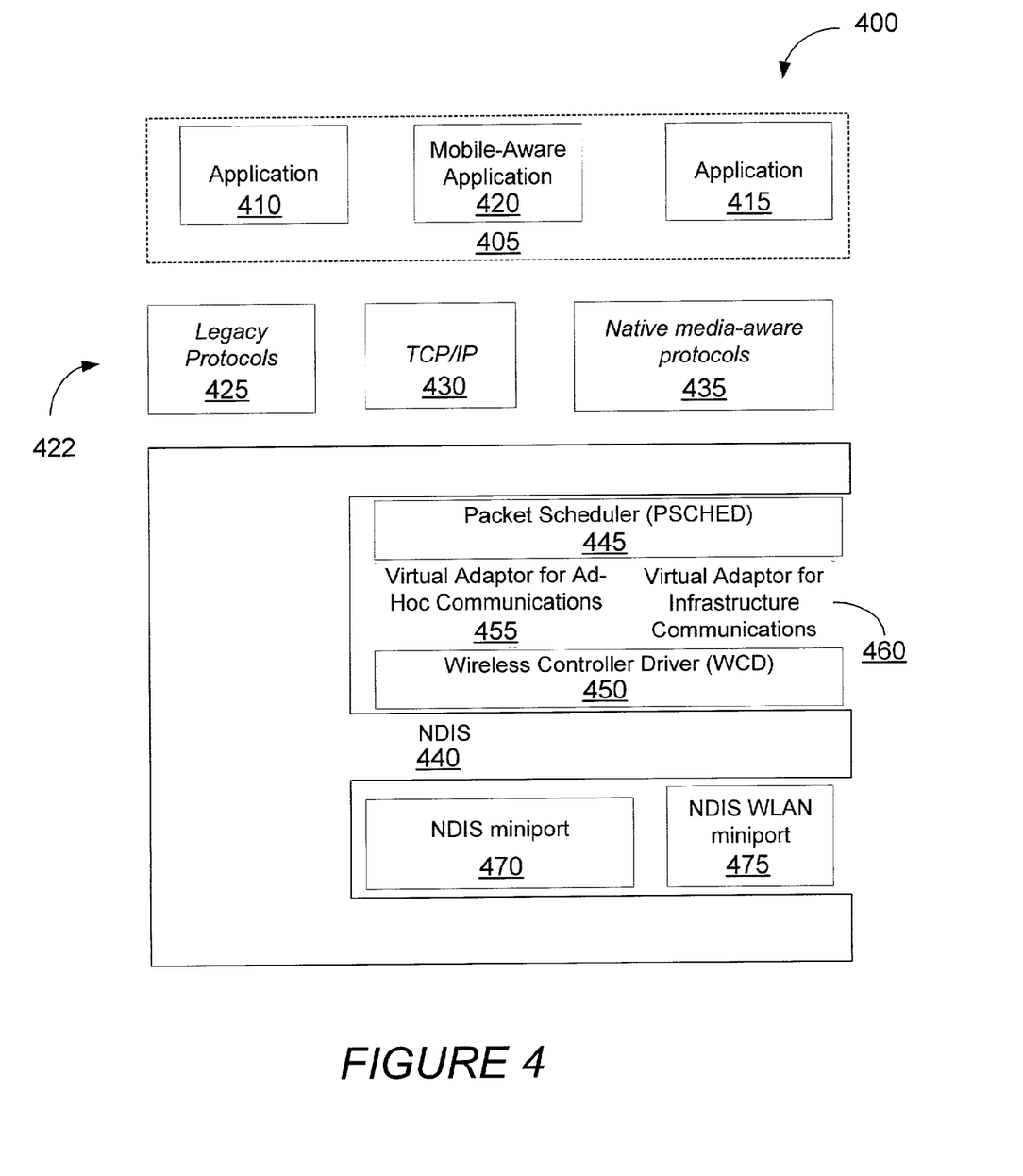
FIG. 4 illustrates an exemplary network protocol stack for dual-mode wireless devices suitable for operation in accordance with the invention.
Figure 5:
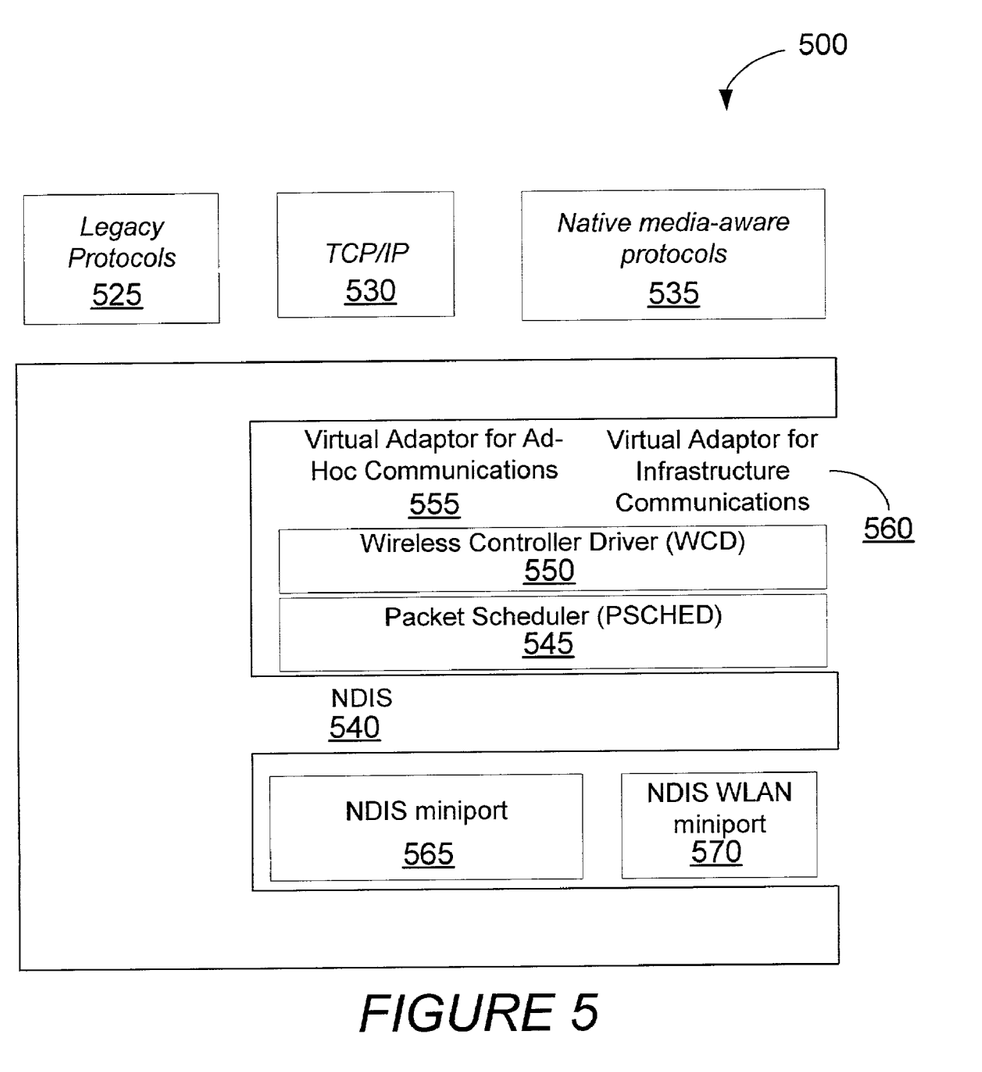
FIG. 5 illustrates an alternative exemplary network protocol stack for dual-mode wireless devices suitable for operation in accordance with the invention.

Two implementations of the wireless controller driver based on the Windows NT operating system architecture of Microsoft Corporation are shown in FIGS. 4 and 5, respectively. Turning first to FIG. 4, in this implementation, the wireless controller driver is implemented as a "shim" in the Network Driver Interface Specification ("NDIS") driver layer 440 in the networking stack 400, which is shown in a representation generally similar to the Open Systems Interface ("OSI") networking model. In the OSI model, a networking stack is represented as a set of layers, usually seven layers, such that each layer processes packets without regard to the subsequent processing by other layers. As illustrated in FIG. 4, at the top of the networking stack is the application layer 405, which includes application programs such as applications 410 and 415, and a mobile-aware application 420. A mobile aware application is one that keeps informed of and adapts to mobility-initiated changes in the environment (address and configuration changes due to the node getting connected to a different network, the changes in the speed, latency, congestion, loss, throughput between networks, the location of the host, etc). It uses functions provided by the operating system for this purpose.

The application layer 405 sends and receives packets (via intermediate layers not shown in FIG. 4) to the transport protocol layer 422, which is illustrated to have legacy protocols 425, the TCP/IP 430, and native media aware protocols 435. As shown in FIG. 4, the wireless controller driver is placed between a packet scheduler driver 445 ("PSCHED") and the WLAN miniport driver 475.

The protocols in the transport protocol layer 422 in turn communicate with the NDIS-compliant driver layer 440. The NDIS driver layer 440 is a framework for supporting packet scheduler 445 and other NDIS drivers. The packet scheduler 445 services packet flows in order of priority or weight. The packet scheduler 445 sends packets down the network protocol stack in accordance with their respective quality of service ("QoS") levels.

As shown in FIG. 4, in this implementation, the wireless controller driver 450 is inserted between the packet scheduler 445 and the wireless LAN miniport 475 in the stack. At its upper edge, the wireless controller driver 450 exposes two wireless LAN adapters, namely the AH wireless adapter 455 and the IS wireless adapter 460. The wireless controller driver also creates for each mode of operation a queue for storing packets in the data flow for that mode. The queue holds packets for that mode transmitted by the protocols in the higher layer, such as the TCP/IP, until that mode becomes active. When the corresponding mode becomes active, the packets in the queue are passed down to the miniport wireless device driver 475 for transmission over the associated wireless network.

The packet scheduler 445, being above the wireless controller driver in the stack, is utilized for handling flows for the two virtual adapters 455 and 460. To the packet scheduler, the two virtual adaptors exposed by the wireless controller driver 450 would look like real physical adapter, and it would bind to these two adapters and expose two corresponding adapter at its own upper edge. The wireless controller driver 450 is able to set the type of the flows in the packet scheduler for the two virtual adapters. It can also return appropriate values for the speeds of the two networks based on the speed of the WLAN network and the bandwidth apportioned to each of the two modes.

If the TCP/IP layer or an application or WCD does not set the flows, the packet scheduler 445 would use the "best effort" policy as the default scheme of flow control. The wireless controller driver 450 would indicate to the packet scheduler 445 the online/offline status of the adapters as they come on/off because of the switching of the modes. It should be noted that the online/offline status is a different kind of indication than the media connect/disconnect indication. Specifically, media connect/disconnect indication is typically used for indicating handoff between access points and is propagated up the stack to the protocol drivers. The on/off status indication, on the other hand, is meant primarily for triggering transmissions from the queues maintained by the packet scheduler. The WCD will trigger an on/off status triggering the Packet Scheduler (PS) to send packets down. In this case, there is no need for any queue in the WCD.

In an alternative implementation, no on/off status is given to the PS. The PS will send packets down based on the transmission rate and type of flow set for the flows that have been established for each adapter. In this case, WCD will have to maintain queues in order to buffer packets when the mode corresponding to the adapter is off.

As will be described in greater detail below, the switching of the wireless network mode is triggered by poll signals broadcast by an access point of the IS network. In response to the poll signals, the wireless controller driver will disable one of the virtual IS and AH modes of operation and enable the other in the NDIS WLAN miniport driver For purposes of adapter configuration, the IS wireless adapter, like a wire-line adapter, is preferably exposed to the user through the graphic user interface ("GUI") of the operating system. The user will be able to specify a static network configuration or enable the adapter for configuration under the Dynamic Host Configuration Protocol ("DHCP"). If enabled for DHCP, the wireless device will get the card's configuration as well as some global configuration from a DHCP server.

For the AH mode, the wireless device may take an address from a reserved range. This range may, for instance, be a sub-range within the auto net range specified by IANA for operations on a non-routed single LAN network. As an example, it could be the range of address between 169.254.254.0 and 169.254.254.255. Before taking an address in the reserved range, the client checks for conflicts through gratuitous Address Resolution Protocol ("ARP") query packets according to the standard TCP/IP semantics.

The virtual infrastructure wireless adapter 460 is preferably assigned with a higher priority than the virtual ad-hoc wireless adaptor 455. In other words, when a TCP/IP client (which may be an application or a kernel mode client) queries the addresses of the wireless device, the auto net address can either be the last address in the list or not returned in the list. This rule prevents a TCP/IP client from binding to the auto net address since typically clients that call a function to get the addresses of the machine bind to the first one in the list. In general, for legacy non-mobile-aware applications, it is not desirable to allow TCP/IP client to bind to an auto-net address because it is not routable. However, in another embodiment, one may return the autonet address in the list for the benefit of newer mobile-aware applications that may choose to bind to the autonet address when communicating with devices having autonet addresses. This has advantages in that applications that bind to a specific autonet address along with binding to a routable address can continue to use their autonet address to communicate with applications on other nodes on the same WLAN even when the DHCP assigned routable address expires The ad-hoc interface's IP address is used as the address of the default gateway for packets on the ad-hoc network. This results in the stack initiating an ARP query when communicating with any address over the ad-hoc interface. Moreover, the default gateway over the IS interface is preferably treated as a higher metric than the one over the ad-hoc interface. Also, the DNS (domain name service) resolver on a wireless node preferably performs a multicast DNS on all adapters after querying the DNS servers on the IS network (as set statically or through DHCP) to find nodes on the ad-hoc network.

With respect to name resolution, a dual-mode device resolves WINS and DNS names by querying the WINS and DNS servers specified when communicating on the IS network or by broadcast/multicast DNS queries when communicating on the AH network. In other words, the manner in which name resolution is done depends on the adapter (IS or AH) a client application wants to communicate over. For instance, the TCP/IP stack would use the virtual adapter corresponding to the IP address the client application is bound to. If the client application is not bound to either the AH or IS virtual adapter (e.g., it is bound to the free floating INADDR_ANY address), then both unicast and broadcast/multicast name queries will be used to resolve the name, the former over the IS adapter and the latter over the AH adapter. In other words, the queries will be sent to the IS configured WINS and DNS servers as well as broadcast/multicast on the AH network. If the AH adapter is statistically configured with addresses of DNS/WINS, the name servers of the AH adapter will be queried instead of a broadcast/multicast.

Exposing two adapters to the TCP/IP results in the TCP/IP creating separate routing table entries for each. This helps in the TCP/IP directing packets over the right adapter based on the destination address in the IP header of the packet. For example, packets to be sent to autonet "AH reserved" addresses are rightly directed over the AH adapter while packets to be sent to routable addresses or to the autonet "non-AH reserved" address range are directed over the IS adapter. In other words, using non-overlapped IP subnets for AH and IS adapters results in packets getting transmitted over the right adapter and therefore in the right mode because of the routing table entries created by the TCP/IP to map the AH and IS IP subnets to the AH and IS adapters respectively.

FIG. 5 illustrates and alternative implementation of the wireless controller driver. In this implementation, the wireless controller driver 550 is placed between the TCP/IP 530 in the protocol layer and the packet scheduler 545, rather than under the packet scheduler as in the implementation shown in FIG. 4. Like the arrangement in FIG. 4, the wireless controller driver 550 exposes a virtual ad-hoc wireless adapter 555 and a virtual infrastructure wireless adapter 560. The wireless controller driver 550 also sets the flows for each mode in the packet scheduler 545 and triggers the packet scheduler into sending packets from one queue or the other when the mode is switched.

The difference between this implementation from the one described in FIG. 4 is in the manner in which the mode-switch trigger is given, since in this scheme the packet scheduler 545 is not aware of the virtual wireless adapters 555 and 560 corresponding to the flows. In the FIG. 4 scheme where WCD is below the PS, the trigger identifies the adapter (with one or more flows as set by an application) whose packets can be sent down. In the FIG. 5 scheme where WCD is above the PS, the trigger identifies the flow whose packets can be sent down. In the latter case, the flow corresponding to the AH or IS mode is triggered. The flows queued by the PS are all for the one adapter exposed by the WLAN driver to PS, which is unaware that this one adapter is being exposed as two virtual adapters because WCD is above it.

In the embodiment of FIGS. 4 and 5, the switching between the two modes is done by the wireless controller driver (WCD) by plumbing an I/O control (IOCTL) into the WLAN network interface card (NIC) driver instructing it to enable the AH or IS mode of operation. When instructed to switch from IS to AH mode, the WLAN NIC driver does not disassociate from the AP, i.e., it does not log off from the IS network to which it is associated. Correspondingly when instructed to switch back to IS (from AH), the WLAN NIC driver does not re-associate with the AP, i.e., it does not log back on to the IS network since it never disassociated with it earlier. The enabling and disabling of the virtual adapters as described above involves the enabling/disabling of a particular mode of operation as controlled by the WCD, with all relevant state transitions being internal to WCD. The enabling/disabling is not exposed to the drivers layered on top of the WCD. They stay oblivious of the changes of the mode of operation.

Figure 6:
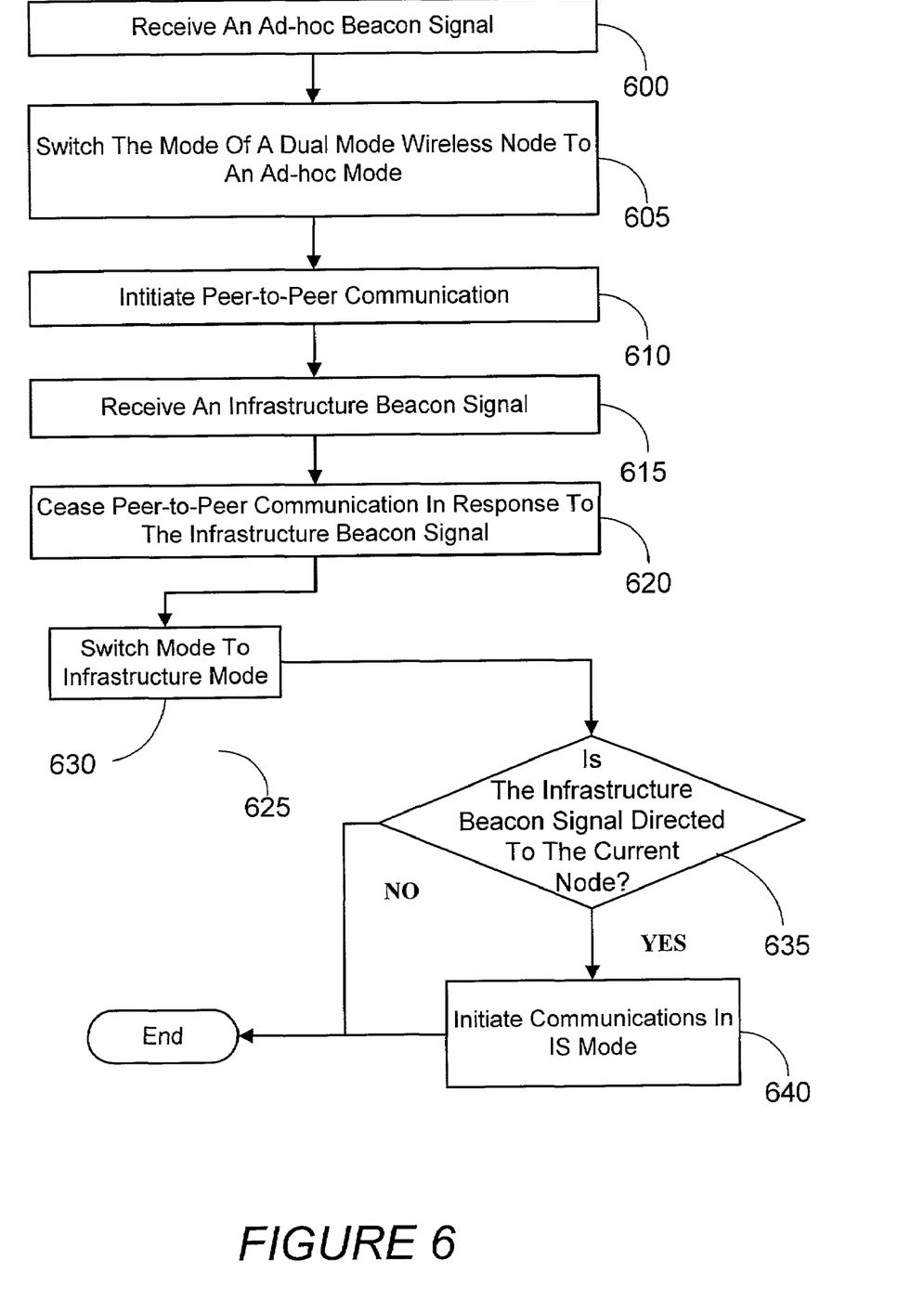
FIG. 6 is a flow chart showing steps in an exemplary method for managing wireless communications via an access point in the presence of a dual-mode wireless node.

FIG. 6 summarizes the steps of the operation of a dual-mode wireless node in an embodiment where wireless communications of IS and AH nodes are managed by an access point. During step 600, the access point transmits an ad-hoc poll signal. The poll signal indicates the mode, AH or IS, that needs to be active and for how long In response to the ad-hoc poll signal, the dual-mode wireless node switches its mode (step 605) for the time period indicated in the poll signal. Following the mode switch, the dual-mode wireless node in its ad-hoc node initiates peer-to-peer communications with other ad-hoc wireless nodes and dual mode nodes operating in the ad hoc mode (step 610). Later, in response to receiving (step 615) an infrastructure poll signal unicast to an IS wireless node, which is not necessarily the dual-mode wireless node, the AH nodes cease their peer-to-peer communications (step 620). The dual-mode wireless node switches its wireless network mode to the infrastructure mode (step 630). If the infrastructure poll signal or any subsequent IS poll signal is directed to the IS address of the dual-mode device (step 635), the dual-mode device transmits the packet in its IS queue over the given frequency channel.

In view of the many possible embodiments to which the principles of this invention may be applied, it should be recognized that the embodiment described herein with respect to the drawing figures is meant to be illustrative only and should not be taken as limiting the scope of invention. For example, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage medium encoded with computer-executable instructions for an access point of a first wireless network to perform steps for coordinating bandwidth usage of a frequency channel shared by nodes in the first wireless network and nodes in a second wireless network, the first and second wireless networks having overlapping ranges of wireless transmission, wherein the nodes of the first wireless network and the nodes of the second wireless network are unable to effectively communicate with each other, the steps comprising:
   receiving registration from nodes of both wireless networks within range of the access point;
   sending first poll signals each for signaling a time slot for at least one node in the first wireless network to transmit over the frequency channel; and
   sending second poll signals each for signaling a time slot for at least one node in the second wireless network to transmit over the frequency channel,
   wherein the first wireless network is an infrastructure network and the second wireless network is an ad hoc network.

2. A computer-readable storage medium as in claim 1, wherein the frequency channel is a radio frequency channel.

3. A computer-readable storage medium as in claim 1, wherein the step of sending the first poll signals designates time slots for wireless nodes of the second wireless network to transmit over the frequency channel constituting a pre-selected portion of the bandwidth of the frequency channel.

4. A computer-readable storage medium encoded with computer-executable instructions for a wireless node of an ad hoc network to share a frequency channel with wireless nodes of an infrastructure network, comprising:
   detecting an access point of the infrastructure wireless network;
   registering with the access point of the infrastructure wireless network;
   listening for a poll signal from the access point signaling a time slot for wireless nodes in the ad hoc network to transmit over the frequency channel, wherein the poll signal is simultaneously broadcast to all wireless nodes in the ad hoc network registered with the access point;
   transmitting communication data over the frequency channel over the ad hoc wireless network within said time slot.

5. A computer-readable storage medium as in claim 4, wherein the frequency channel is a radio frequency channel.

6. A computer-readable storage medium as in claim 4, wherein the wireless node of the ad hoc network is a laptop computer.

7. A computer-readable storage medium as in claim 4, wherein the wireless node of the ad hoc network also operates as a node in the infrastructure network, and having further computer-executable instructions for performing the steps of:
   listening for a second poll signal from the access point signaling a time slot for the wireless node to transmit over the frequency channel in an infrastructure mode;
   transmitting communication data over the infrastructure network over the frequency channel within said time slot signaled by the second poll signal.

8. A computer-readable storage medium encoded with computer-executable instructions for a wireless node to communicate in an infrastructure network and an ad hoc network over a frequency channel shared by the infrastructure and ad hoc networks, comprising the steps of:
   receiving a first poll signal from an access point of the infrastructure network signaling a time slot for infrastructure network transmission;
   switching to an infrastructure mode to operate as a node of the infrastructure network;
   transmitting data in the infrastructure mode over the frequency channel;
   receiving a second poll signal from the access point signaling a time slot for ad hoc network transmission;
   switching to an ad hoc mode to operate as a node of the ad hoc network;
   transmitting data in the ad hoc mode over the frequency channel.

9. A computer-readable storage medium encoded with computer-executable instructions for coordinating usage of a frequency channel shared by nodes in an infrastructure network and an ad hoc network, wherein the nodes of the infrastructure network and the nodes of the ad hoc network are unable to effectively communicate with each other, comprising:

registering, by a first wireless node in the ad hoc network with an access point of the infrastructure network;

sending, by the access point, a first poll signal for signaling time slots for wireless nodes in the ad hoc network to transmit communication data over the frequency channel;

transmitting, by the first wireless node, communication data over the frequency channel within the time slot signaled by the first poll signal;

sending, by the access point, a second poll signal for signaling a time slot for a second wireless node in the infrastructure network to transmit communication data over the frequency channel; and transmitting, by the second wireless node, communication data over the frequency channel within the time slot signaled by the second poll signal.

* * * * *